United States Patent

[11] 3,600,693

[72] Inventor Bert P. VanDenBerg
China Lake, Calif.
[21] Appl. No. 60,495
[22] Filed Aug. 3, 1970
[45] Patented Aug. 17, 1971
[73] Assignee The United States of America as represented by the Secretary of the Navy

[54] SAMPLE-HOLD CIRCUIT
4 Claims, 1 Drawing Fig.

[52] U.S. Cl. .......... 328/151, 307/229, 307/238, 307/246, 307/251, 328/55, 328/122
[51] Int. Cl. .......... H03k 19/00
[50] Field of Search .......... 328/55, 122, 142, 151; 307/229, 238, 246, 251, 293, 304

[56] References Cited

UNITED STATES PATENTS

| | | | |
|---|---|---|---|
| 3,172,043 | 3/1965 | Altman | 328/55 |
| 3,430,072 | 2/1969 | Stevens | 307/250 |
| 3,482,174 | 12/1969 | James | 307/251 X |
| 3,502,992 | 3/1970 | Cooperman | 307/238 X |
| 3,504,194 | 3/1970 | Eastman et al. | 328/151 X |
| 3,553,492 | 1/1971 | Bugay | 328/151 X |

*Primary Examiner*—Stanley T. Krawczewicz
*Attorneys*—R. S. Sciascia and Roy Miller

ABSTRACT: A sample-hold circuit which provides an interface between the electronic and mechanical portions of a missile wherein it is required that a signal be held for a finite time comprising two complete sample-and-hold circuits in series.

PATENTED AUG 17 1971 3,600,693
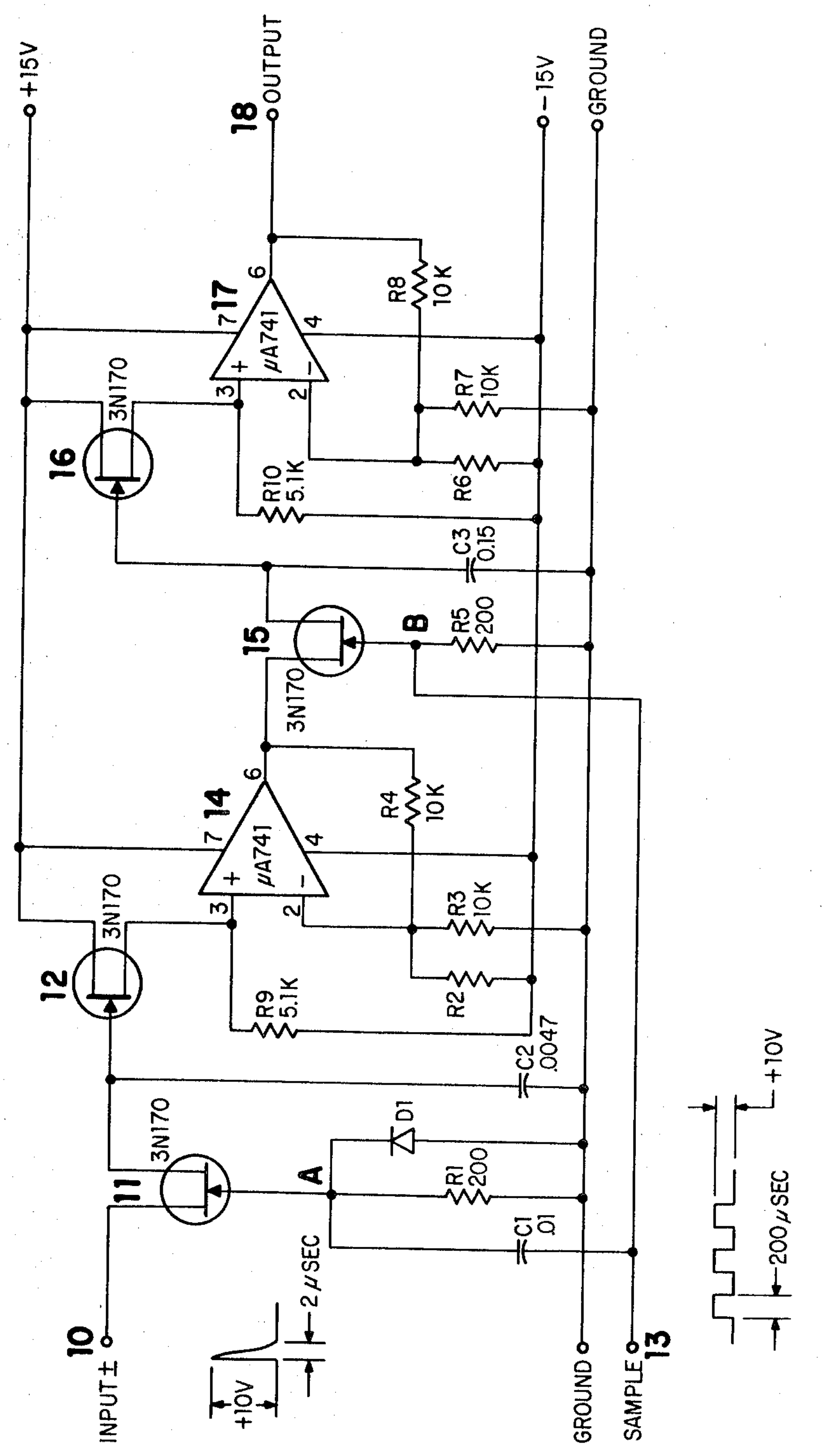
*INVENTOR.*
BERT VAN DEN BERG
*BY* ROY MILLER
ATTORNEY

SAMPLE-HOLD CIRCUIT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention is concerned with the provision of a circuit to interface between the electronic and mechanical portions of the missile which requires a signal which may be held for a long finite time. In designing electronic sample-and-hold circuitry, one must trade off between maximum hold time and minimum charge time. Due to the finite charging resistance and the leakage resistance associated with the usual sample-and-hold circuits, the ratio of hold time to sample time is limited to values below 500 when accuracy is required.

BRIEF DESCRIPTION OF THE DRAWING

The FIGURE is a circuit diagram of the sample-and-hold circuit.

DESCRIPTION OF THE PREFERRED EMBODIMENT

The circuit set forth in the FIGURE circumvents the problem of low hold time to sample time ratios by connecting two complete sample-and-hold circuits in series. The first circuit samples an analog input signal and holds the desired amplitude long enough to allow the second sample-and-hold sufficient time to sample the output of the first. In that each stage is run at a hold time to sample time ratio well below 500, an accuracy of better than one percent is achieved with a total hold time to sample time ratio exceeding 40,000.

The circuit incorporates an input terminal 10 adapted to receive an input analog signal of either positive or negative polarity which is coupled to a metal oxide semiconductor field effect transistor (MOSFET) 11. The output of the MOSFET 11 is coupled to the gate of another MOSFET 12 and also coupled to one side of capacitor C2 which is in turn connected to ground.

A sample pulse is coupled from an input terminal 13 through capacitor C1 to the gating element of MOSFET 11. The gate element of the MOSFET is also coupled to ground through a biasing resistor R1 connected in parallel with a diode D1.

MOSFET 12 is connected in a source follower configuration and the drain thereof is connected to a source of 15-volt positive potential. The source of MOSFET 12 is connected to the input of an operational amplifier 14 whose output is connected to the input of another MOSFET 15. The source of MOSFET 12 is also connected through a bias resistor R9 to a −15-volt source. Gain of the operational amplifier 14 is controlled by a gain adjust resistor R4 connected from the output to the inverting input of the amplifier 14 and resistor R2 which provides bias and is connected between the inverting input and ground.

The gate source drop of the MOSFET 12 introduces a voltage offset on the output of the operational amplifier 14 which is compensated for by the addition of resistor R2 connected between the inverting input of the operational amplifier 14 and the −15-volt source.

The output of the MOSFET 15 is connected to the gate of MOSFET 16 and also connected to one side of capacitor C3 the other side of which is connected to ground. The drain of MOSFET 16 is connected to the positive 15-volt supply and the source is connected to the input of another operational amplifier 17. A biasing resistor R10 is connected between the source of MOSFET 16 and the −15-volt source. The sample pulse coupled in at input 13 is connected directly to the gate element of the MOSFET which is also connected through resistor R5 to ground.

Gain and bias of the operational amplifier 17 are controlled by resistor R8 connected from the output to the inverting input of the operational amplifier and by resistor R7 which is connected from the inverting input to ground.

The gate source drop of MOSFET 16 also introduces a voltage offset on the output of the operational amplifier 17 which is compensated for by the addition of resistor R6 between the inverting input to the operational amplifier and the negative 15-volt supply.

The held output is present at output terminal 18.

The circuit was designed to sample a 2-microsecond microsecond wide signal of either positive or negative polarity and hold the amplitude for 100 milliseconds. This represents a hold time to sample time ratio of 50,000. By altering the value of the holding capacitors C2 and C3, the same circuit might be used to sample-and-hold over a wide range of times.

The MOSFETS 12 and 16 feeding the operational amplifiers 14 and 17, respectively, connected in the source follower configuration, effectively increase the input impedance of those stages to over several gigohms. As stated previously, resistors R2 and R6, respectively, compensate for the voltage offset introduced by MOSFETS 12 and 16 on the operational amplifiers 14 and 17 and the value thereof will be as required. Also, conventional resistors R4 and R8 are used for the gain adjust on the respective operational amplifiers 14 and 17.

In order to overcome the problem of providing two sample pulses to the MOSFETS 11 and 15 the pulse applied to the MOSFET 15 is differentiated by the circuit combination R1 C1 and applied to MOSFET 11. Diode D1 removes the undesired negative-going part of the differentiated pulse and prevents it from being applied to the gate of the MOSFET 11.

The waveform at point A applied to the gate of the first MOSFET 11 is a 2-microsecond spike having a positive 10-volt level. This is achieved through differentiating circuit R1 C1 and results from differentiating the 200 microsecond 10-volt pulse which appears at point B.

The advantages of the above-described circuit comprise achieving a hold time to sample time ratio which exceeds 40,000 while at the same time achieving a very high order of accuracy.

What I claim is:

1. A long-time sample-and-hold circuit comprising:
 - input means adapted to receive analog signals;
 - sample-hold input means adapted to receive a sample pulse;
 - switch means operatively connected to said input means and having an output;
 - said sample pulse being connected to said switch means for controlling the on-off time of said switch means;
 - amplifier means operatively receiving the output from said switch means for producing an output;
 - hold means operatively connected to the output of said switch means and the amplifier means for holding the input to said amplifier at a level determined by said input pulse for a predetermined time period;
 - another switch means operatively receiving the output of said amplifier means and in turn having an output;
 - another amplifier means operatively connected to said switch means and receiving the output therefrom;
 - said sample pulse being connected to said another switch means for controlling the on-off time of said another switch means; and
 - another hold means operatively connected to the output of said another switch means and said another amplifier means for holding the input to said another amplifier means at a level determined by the output of said amplifier means for a predetermined time period so that an output pulse results from said another amplifier means which is capable of attaining a total hold-time to sample-time ratio exceeding 40,000.

2. A long-time sample-and-hold circuit as set forth in claim 1 and further including:
 - differentiating means operatively coupled in the circuit between the sample input and said first mentioned switching means for differentiating the input sample pulse so that a relatively narrow sample pulse is coupled to the switch means as compared to the sample pulse coupled to said another switch means.

3. A long-time sample-and-hold circuit as set forth in claim 2 wherein:

said hold means comprises a fast time charging capacitor; and said another hold means comprises a capacitor having a slow time constant.

4. A long-time sample-and-hold circuit as set forth in claim 3 wherein;

said switch means and said another switch means comprise electronic gates.